(12) United States Patent
Anatoliy et al.

(10) Patent No.: US 7,327,665 B2
(45) Date of Patent: Feb. 5, 2008

(54) OPTICAL FIBER PROBE USING AN ELECTRICAL POTENTIAL DIFFERENCE AND AN OPTICAL RECORDER USING THE SAME

(75) Inventors: Lapchuk Anatoliy, Kyunggi-Do (KR); Moon-Goo Choi, Kyunggi-Do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 725 days.

(21) Appl. No.: 10/728,307

(22) Filed: Dec. 4, 2003

(65) Prior Publication Data

US 2005/0083826 A1    Apr. 21, 2005

(30) Foreign Application Priority Data

Oct. 21, 2003  (KR) .................. 10-2003-0073480

(51) Int. Cl.
*G11B 9/12*    (2006.01)
(52) U.S. Cl. .................. 369/126; 369/112.27
(58) Field of Classification Search .................. None
See application file for complete search history.

(56) References Cited

U.S. PATENT DOCUMENTS 5,627,922 A * 5/1997 Kopelman et al. ............ 385/12

| | | |
|---|---|---|
| 2003/0015651 A1* | 1/2003 | Kiguchi et al. ............. 250/234 |
| 2003/0085351 A1* | 5/2003 | Nakajima et al. ........... 250/306 |
| 2003/0155934 A1* | 8/2003 | Moreland et al. ........... 324/629 |
| 2003/0184328 A1* | 10/2003 | Lee et al. .................... 324/750 |

FOREIGN PATENT DOCUMENTS

| | | |
|---|---|---|
| JP | 09-281123 | 10/1997 |
| JP | 2002-090283 | 3/2002 |
| JP | 2003-114184 | 4/2003 |
| JP | 2004-163417 | 6/2004 |
| KR | 2003-0044141 | 6/2003 |
| KR | 10-2003-0077734 | 10/2003 |

* cited by examiner

*Primary Examiner*—Wayne Young
*Assistant Examiner*—Lixi Chow
(74) *Attorney, Agent, or Firm*—Gottlieb, Rackman & Reisman, P.C.

(57) ABSTRACT

An optical fiber probe generates an electrical potential difference formed between thin metal layers coated thereon to increase a light transmission rate. The optical fiber probe includes a near-field probe having a core transmitting light incident from an external light source and having a circular cone structure formed on an end of the core, and a cladding coated on a surface of the circular cone structure core to protect the core. The optical fiber probe also includes the thin metal layers coated on the near-field probe, symmetrically disposed on opposite sides of the near-field probe, and spaced-apart from each other to generate the electrical potential difference.

8 Claims, 9 Drawing Sheets

OPTICAL FIBER PROBE USING AN ELECTRICAL POTENTIAL DIFFERENCE AND AN OPTICAL RECORDER USING THE SAME

CROSS-REFERENCE TO RELATED APPLICATION

This application claims to benefit of Korean Patent Application No. 2003-73480, filed Oct. 21, 2003 in the Korean Intellectual Property Office, the disclosure of which is incorporated herein by reference.

BACKGROUND OF THE INVENTION

1. Field of the Invention

The present invention relates to an optical fiber probe using an electrical potential difference and an optical recording and/or reproducing apparatus using the same, and more particularly, to an optical fiber probe using an electrical potential difference generated between a plurality of thin metal layers coated on the optical fiber probe and spaced-apart from each other to improve a light transmission rate, and an optical recording and/or reproducing apparatus using the same.

2. Description of the Related Art

Generally, in order to store more information in a unit area in an optical medium in an information recording apparatus, a wavelength of a laser beam emitted from a recording optical source should be reduced, and a numeral aperture of a condensing lens should be increased. The wavelength of the laser beam of the recording optical source can be reduced, and the numeral aperture of the condensing lens can be increased up to 1.0 using a blue laser diode. However, in a case of an optical information recording method, it is a limitation in storing the high density of information in a next generation optical information storing apparatus, which requires high dense recording, due to diffraction of light.

In order to overcome the above problems, there have been developed conventional technologies, such as a scanning probe recording (SPR) technology using a probe of an atomic force microscope, an ultra resolution medium technology, or a technology using a near-field optical fiber probe, to overcome the problems occurring due to the diffraction of the light.

As a first example of the conventional technologies, a technology is used for the near-field optical fiber probe to output the laser beam through a very small aperture having a diameter of tens nm or hundreds nm. However, the near-field optical fiber probe is mechanically weak and fragile, and a plurality of optical fiber probes cannot be accurately arranged. A light throughput (transmission) rate of the light passing through an opening of a near field optical probe is very small, for example, the light throughput rate is $10^{-5}$ through $10^{-7}$ in a case of the opening of 100 nm in size. Therefore, it is very difficult to utilize the near-field optical fiber probe technology in the optical information storage apparatus since a recording and data processing speed is very low. That is, in order to be used in the optical information recording apparatus, the near-field optical fiber probe technology requires the opening having a higher light throughput rate, and the near-field optical fiber probe is required not to be abrasive. Since it is very difficult to accurately arrange a plurality of near-field optical fiber probes, the conventional near-field optical fiber probes cannot be improved to meet a recording and reproducing speed required in the optical information recording and reproducing apparatus.

A technology of manufacturing a conventional probe unit having a plurality of openings using a semiconductor process as a second example of the conventional technologies will be explained in reference with FIG. 1.

Referring to FIG. 1, the probe unit includes a plurality of holders 11, a plurality of probes 12 disposed below corresponding ones of the holders 11, and a plurality of openings 13 formed between the adjacent probes 12. Since a light throughput (transmission) rate of a laser beam (light) passing through the openings 13 is lower than $10^{-5}$ like as the conventional optical fiber probe, the light throughput rate needs to be improved. A method of exciting Plasmon or another method of reducing an area in which an optical loss occurs from a wavelength of the end portion of the probes 12 has been used to improve the light throughput rate of the laser beam passing through the openings 13 formed on end portions of the probes 12.

As a third example, in the method of exciting the Plasmon to improve the light throughput rate of the laser beam passing through the openings 13 formed on the end portions of the probes 12, a Plasmon mode cannot effectively excite the Plasmon since an excitation efficiency depends on polarization of an incident beam. In order to effectively excite the Plasmon, a specific structure to excite the Plasmon should be formed using a particular process.

A fourth example of the conventional methods has been introduced to improve a structure of end portions of optical fiber probes by manufacturing openings having a higher light throughput rate of a laser beam so that an optical loss area is minimized. The conventional method of manufacturing the openings to reduce the optical loss area has been used to form the conventional optical fiber probes. The method includes forming a structure of the end portions of the optical fiber probes having a wide cone angle to form the openings, forming a reflective layer on a first taper area to reflect an incident beam, forming the reflective layer on the second taper area to widen the wide cone angle to reduce the optical loss area to a maximum degree, and forming a small opening of a probe shape in a third taper area to have the higher light throughput rate. However, in the method of forming the opening, a size of the opening having the maximum light throughput rate is determined according to a size of the first taper area, and the opening is formed through a plurality of wet-etching processes. Therefore, the method of forming the opening becomes complicated, and the probes formed by this probe method cannot be used in storing a high density of optical information since the end portions of the optical fiber probes are too bulky in size.

As a fifth example, the conventional method of forming the opening having the higher light throughput rate using the semiconductor process and the wet-etching process includes forming the probe using silicon etching processes including a non-uniform directional etching process, forming an oxide layer at a low temperature, and forming the end portion of the probe in a structure having an edge angle of a large parabola to reduce the optical loss area. However, in this large parabolic structure, the probe manufacturing process including the low temperature oxide layer forming process becomes complicated, and it is difficult to form the end portion of the probe in the large parabolic structure.

As described above, the light throughput rate may be improved by the conventional method of forming the opening. In addition, another conventional method including a silicon semiconductor manufacturing process similar to the above method of forming the opening by the reflective layer of the large cone angle structure has been proposed. FIG. 2 is a view showing another conventional near-field optical head manufactured using the silicon semiconductor manufacturing process.

Referring to FIG. 2, the conventional method includes forming a relatively large opening of 11 mm to 2 mm using the silicon semiconductor process, and coating a reflective layer thereon. This structure corresponds to the first taper area described in the fourth example of the conventional methods. A relatively small opening of 60 nm is formed on a center portion of the coated reflective layer so that the opening having the high light throughput rate is formed. A third non-linear thin layer is additionally coated on the reflective layer, and a self focusing, which is a characteristic of the third non-linear thin layer, is generated through the third non-linear thin layer to improve the light transmission (throughput) rate of the opening.

Although the conventional method of improving the light throughput rate may be used in forming the reflective layer within the first taper area and forming the opening on the reflective layer to form the opening having the high light throughput rate, it is difficult to physically implement this conventional method in forming the opening since the light mode reflected from the reflective layer cannot be completely transferred to all modes, which exist in the opening, using the reflective layer only. Moreover, in this conventional method of improving the light throughput rate, there still exists a large area, in which the light loss occurs like as the conventional optical fiber probe, in the opening. Furthermore, even if an additional thin coating layer is formed on the reflective layer to cause the self focusing, a self focusing phenomenon does not occur since reflective indexes are spatially different according to the nonlinear characteristic, and the reflective index determined in the previously formed structure is changed to another reflective index which is spatially different from the reflective index. Since the reflective index is changed, the change in the reflective indexes causes a phase difference in the laser beam, thereby distorting a beam size and a beam shape. The beam size may be enlarged since a defocusing phenomenon can occur rather than the self focusing. That is, in the coated structure formed with non-linear thin layer according to the above conventional method of improving the light throughput rate, reducing of the beam size is limited up to one wavelength of the light. The light throughput rate cannot be improved. Since the probe has a flat structure of the end portion rather than the probe structure, this structure cannot be used in storing the optical information, and it is impossible to implement a probe method and a near-field method.

In order to solve the above problems, Korean patent application No. 2001-74731 discloses a technology of generating a self focusing phenomenon, completely filling the opening with a material having a third non-leaner coefficient, reducing the beam size into a half of the wavelength of the laser beam, and focusing the laser beam in a parabolic shape having no optical loss to effectively excite the near-field in the opening disposed on the end portion of the probe, thereby increasing the light throughput rate of the optical information probe.

The technology disclosed in the Korean patent application No. 2001-74731 and improving the light (laser beam) transmission (throughput) rate will be explained in detail hereinafter.

FIG. 3 is a perspective view showing a structure of a conventional optical recording and/or reproducing head using a conventional laser beam transmission improving method disclosed in the Korean patent application No. 2001-74731. Referring to FIG. 3, the conventional optical recording and/or reproducing head includes two units.

The conventional optical recording and/or reproducing head include a lower structure and an upper structure. The lower structure is formed with a silicon substrate 21 as a head holder. The upper structure includes an opening 25 having a reverse trapezoidal shape filled with a non-linear material 28, and a metal thin layer 27 to form a probe, and an end portion of the upper structure is connected to the lower structure.

Here, the upper structure includes a silicon deposition layer 23, and a silicon oxide 22 is formed on a boundary of the upper structure and the lower structure. A plurality of probes formed with the metal thin layer 27 is formed on a lower portion of the upper structure. A portion of the non-linear material 28 filled in the opening 25 having the reverse trapezoidal shape formed on the silicon deposition layer 23 by an etching process is exposed through a lower portion of the silicon deposition layer 23 of the upper structure.

A method of manufacturing the optical recording and/or reproducing head having the above structure will be described hereinafter.

After the silicon oxide layer 22 is formed on a silicon substrate 21, the silicon deposition layer 23 is formed on the silicon oxide layer 22. After first and second nitride layers (not shown) are formed on an upper surface of the silicon deposition layer 23, a predetermined area of a lower portion of the silicon substrate 21 is exposed by patterning the first nitride layer formed on the lower portion of the silicon substrate 21. The exposed area of the silicon substrate 21 is 1 through 10 nm$^2$. Here, a silicon oxide layer or a silicon nitride layer can be used as the first or second nitride layer.

In a state that the predetermined area of the lower portion of the silicon substrate 21 is exposed, the exposed predetermined area of the lower portion of the silicon substrate 21 is etched by a first etching process. The lower portion of the silicon substrate is etched by 1000 μm.

The first etching process is a wet-etching process to maintain the silicon substrate 21 by a predetermined thickness from the silicon oxide layer 22. Since the silicon deposition layer 23 is formed to be thinner than a thickness of the silicon substrate 21, the silicon deposition layer 23 is physically protected.

After the first etching process is finished, a predetermined area of the silicon deposition layer 23 is exposed by patterning the second nitride layer formed on the upper surface of the silicon deposition layer 23, and then a plurality of apertures 25 are formed by a second etching process.

Here, the second etching process is a dry-etching process. The opening 25 is formed in the reverse trapezoidal shape, and the silicon oxide layer 22 is exposed through a lower portion of the opening 25. The etching process is performed on the lower portion of the silicon substrate 21 where the first nitride layer is not formed, and the lower portion of the silicon oxide layer 22 is exposed by eliminating a remaining silicon substrate. Thus, the silicon substrate 21 is divided with respect to the opening 25.

However, compared to a highly advanced information processing field which it is required to rapidly write a large amount of data on a recording medium and reproduce the data from the recording medium, it is difficult to improve a writing and reproducing function of the optical information storage apparatus up to a required level of the current technology while the amount of light transmitted through the opening of the probe among transmitted light through an optical fiber is increased in the light throughput rate of the conventional opening.

SUMMARY OF THE INVENTION

In order to solve the above and/or other problems, it is an aspect of the present invention to provide an optical fiber probe to improve a light transmission (throughput) rate using an electric potential generating between metal thin layers coated on the optical fiber probe.

It is another aspect of the present invention to provide an optical fiber probe to accurately analyze a characteristic of a test material in a near-field optical telescope apparatus by increase a light transmission rate of the optical fiber probe using an electric potential generated between the metal thin layers spaced-apart from each other.

It is another aspect of the present invention to provide an optical fiber probe to improve an optical information writing and/or reproducing optical information on and/or from a recording medium by increasing a light transmission rate of the optical fiber probe, and an optical recording and/or reproducing apparatus using the same.

Additional aspects and advantages of the invention will be set forth in part in the description which follows and, in part, will be obvious from the description, or may be learned by practice of the invention.

To achieve the above and/or other aspects, there is provided an optical fiber probe which includes a near-field probe having a core transmitting light incident from an external light source and a cladding coated on a surface of the core to protect the core, and metal thin layers coated on the near-field probe, symmetrically disposed on opposite side of the near-field probe, and spaced-apart from each other to generate a voltage potential difference.

To achieve the above and/or other aspects, there is provided an optical recording and/or reproducing apparatus which includes a laser diode generating a laser beam (light), an optical disc storing data using an optical signal, an optical fiber transmitting the light emitted from the laser diode, a near-field probe scanning the light on a recording medium by transmitting the light, which is incident from the laser diode, using a voltage potential difference therebetween, a lens condensing the light emitted from the laser diode to scan the laser beam using the optical fiber.

To achieve the above and/or other aspects, there is provided an optical fiber probe used with an optical recording and/or reproducing apparatus, the optical fiber probe including an optical fiber having a core to transmit light incident from an external light source, and a cladding coated on a surface of the core to protect the core, a near-field probe formed on one end of the optical fiber to emit the light transmitted through the optical fiber, and a plurality of metal layers formed on the near-field probe and spaced-apart from each other by a distance to generate an electrical potential difference therebetween.

According to another aspect of the present invention, the near-field probe comprises an opening formed on a distal end thereof, and the electrical potential difference increases a light transmission rate of the opening.

According to another aspect of the present invention, an amount of the light transmitted through the opening is increased according to an increase of the light transmission rate.

According to another aspect of the present invention, a diameter of the opening is smaller than a wavelength of the light passing through the opening.

According to another aspect of the present invention, the near-field probe has a structure corresponding to a frustum of a cone, and the metal layers are formed on an outer circumferential surface of the structure.

According to another aspect of the present invention, each of the metal layers has the same shape as a portion of the outer circumferential surface of the frustum of the cone.

According to another aspect of the present invention, each of metal layers has two sides perpendicular to a center line of the near-field probe.

According to another aspect of the present invention, each of metal layers has two sides parallel to each other.

According to another aspect of the present invention, the metal layers have the same area.

According to another aspect of the present invention, the metal layers comprises first and second conductive layers, the near-field probe comprises a cone shaped structure extended from the core of the optical fiber, and the first and second conductive layers are formed to have a portion of the cone shaped structure of the near-field probe.

To achieve the above and/or other aspects, there is provided an optical recording and/or reproducing apparatus comprising a light source generating light, an optical fiber having a core to transmit the light incident from the light source, and a cladding coated on a surface of the core to protect the core, a near-field probe formed on one end of the optical fiber to emit the light transmitted through the optical fiber toward a recording medium, and a plurality of metal layers formed on the near-field probe and spaced-apart from each other by a distance to generate an electrical potential difference therebetween.

According to another aspect of the present invention, the near-field probe comprises an opening formed on a distal end thereof, and the electrical potential difference increases a light transmission rate of the opening.

To achieve the above and/or other aspects, there is provided a method used with an optical recording and/or reproducing apparatus, the method including generating light from a light source, transmitting the light through an optical fiber having a core and a cladding coated on a surface of the core to protect the core, transmitting the light toward a recording medium through a near-field probe formed on one end of the optical fiber, and generating an electrical potential difference using a plurality of metal layers formed on the near-field probe and spaced-apart from each other by a distance.

BRIEF DESCRIPTION OF THE DRAWINGS

These and/or other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
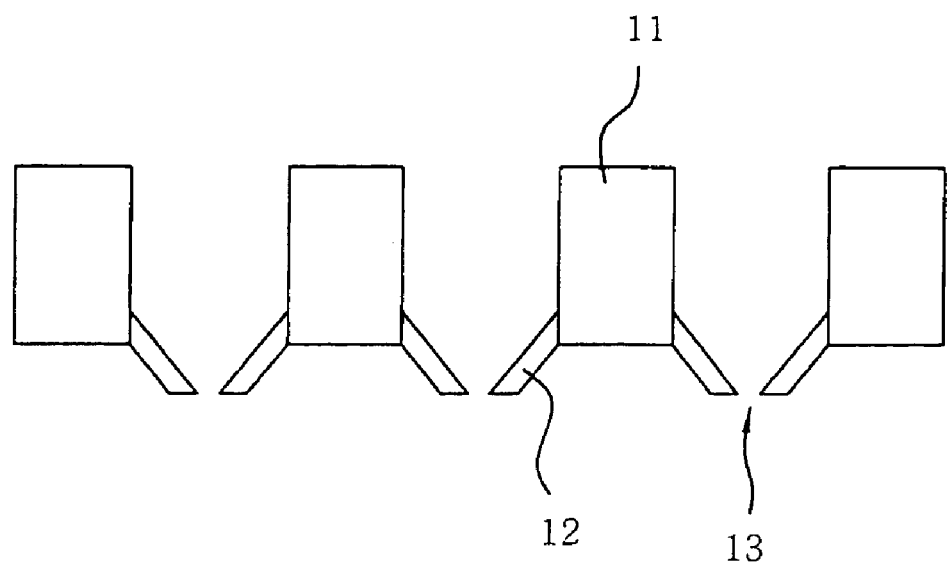
FIG. 1 is a view showing a conventional optical fiber probe having a plurality of openings.
Figure 2:
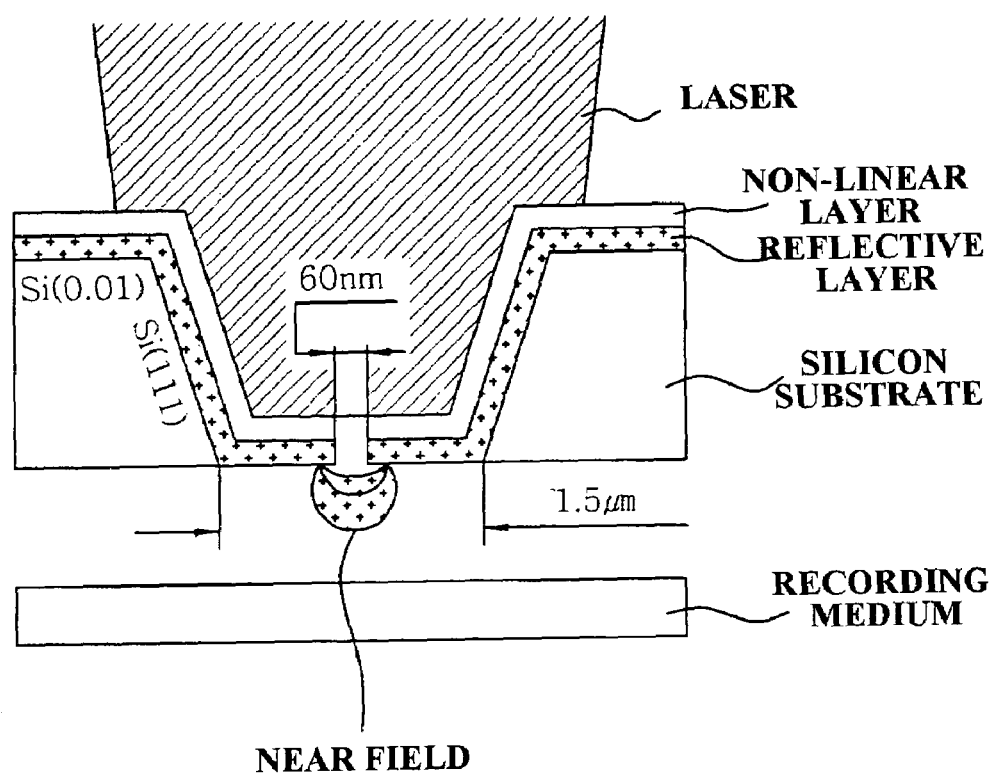
FIG. 2 is a view showing a conventional near-field optical head manufactured using a silicon semiconductor manufacturing process.
Figure 3:
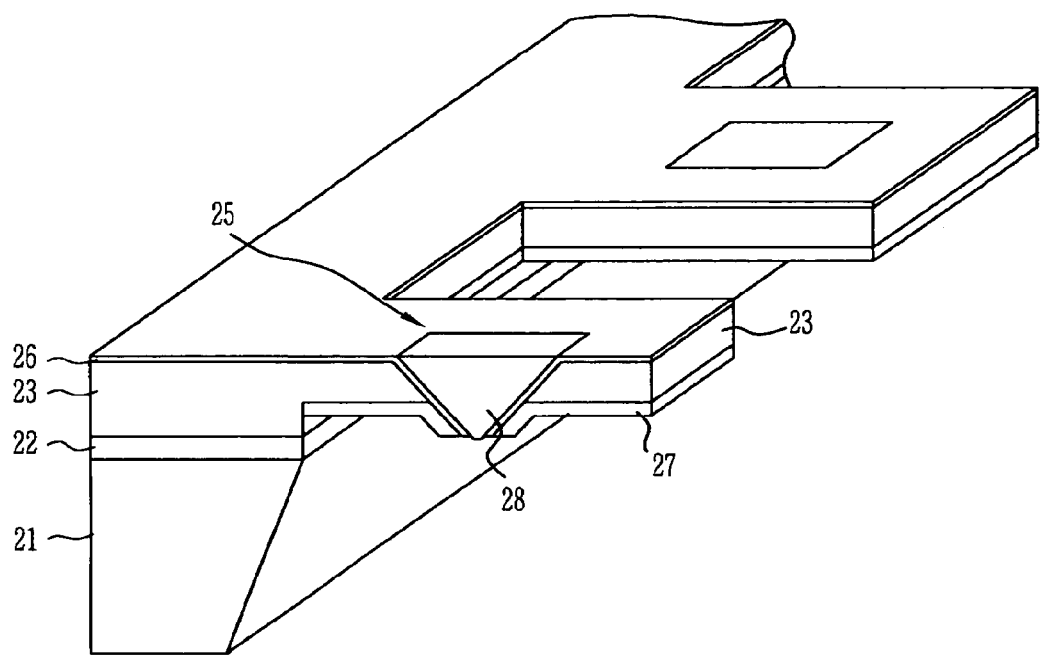
FIG. 3 is a perspective view showing a structure of a conventional optical recording and/or reproducing head using a conventional laser beam transmission improving method.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Figure 4:
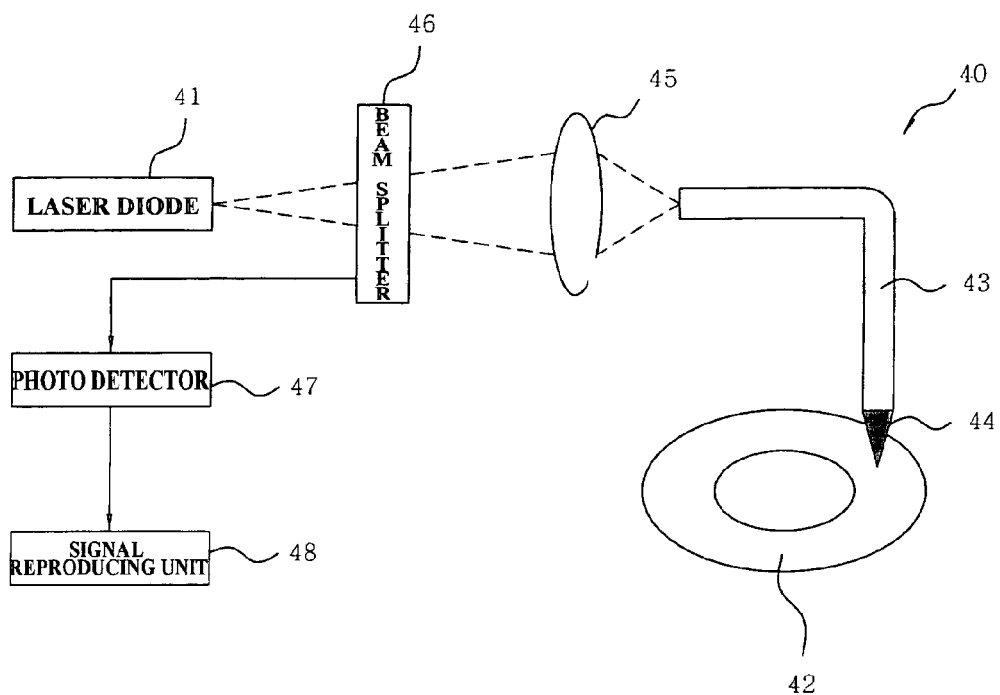
FIG. 4 is a view showing an optical information recording and/or reproducing apparatus according to an embodiment of the present invention.

FIG. 4 is a view showing an optical information recording and/or reproducing apparatus 40 according to an embodiment of the present invention.

Referring to FIG. 4, the optical information recording and/or reproducing apparatus 40 includes a laser diode 41, an optical disc 42 storing data using optical signal, an optical fiber 43 wave-guiding the laser beam, a near-field probe 44 condensing and irradiating the laser beam on an optical medium, such as an optical disc 42, and a lens 45 condensing and irradiating the laser beam emitting from the laser diode 41 toward the optical fiber 43.

The optical information recording and/or reproducing apparatus 40 further includes a beam splitter 46 splitting the laser beam reflected from the optical disc 42 through the optical fiber 43 and wave-guided by the optical fiber 43, an photo detector 47 converting an optical signal corresponding to the laser beam into a current signal, and a signal reproducing unit 48 reproducing data stored on the optical disc 42 according to the current signal converted (detected) by the photo detector 47.

Here, a convex lens can be used as the lens 45 to condense the laser beam on the optical fiber 43. The photo detector 47 is a photo diode converting the optical signal into the current signal.

An operation of the optical information recording and/or reproducing apparatus 40 having the above structure will be explained hereinafter. A process of writing (storing) information (data) on the optical disc 42 using the optical signal will be explained before the operation of the optical information recording and/or reproducing apparatus 40 is explained.

The laser beam corresponding to the information to be stored is emitted from the laser diode 41, and then the laser beam is condensed onto the optical fiber through the lens 45.

The laser beam condensed by the lens 45 is wave-guided by the optical fiber 43 to the near-field probe 44. A very small portion of the laser beam wave-guided by the optical fiber 43 is transmitted through an opening of the near-field prove 44 to form a near field. All portions of the laser beam wave-guided by the optical fiber 43 cannot be transmitted through the near-field probe 44 while the small portion of the laser beam wave-guided by the optical fiber 43 can be used in forming the near field since a width of the near-field probe is very minute and narrow.

As described above, light (laser beam) forming the near field adjacent to the opening of the near field probe 44 can be used in writing the information (data) on the optical disc 42. Here, the light forming the near field is irradiated on the optical disc 42 to deform a portion of the optical disc 42 to write the information.

Since the information is written (stored or recorded) on the optical disc 42 according to the above-described process, it is easy to write the information by deforming the portion of the optical disc 42 if the amount of the transmitted laser beam (light) through the near-field probe 44 is increased. That is, the portion of the optical disc 42 is easily deformed according to the intensity of the light forming the near field.

In addition, since the width of the deformed portion of the optical disc 42 is proportional to a diameter of an area of the light forming the near field, the amount of the information to be written on the optical disc 42 is determined according to the diameter of the near field formed adjacent to the near-field probe 44.

According to an aspect of the present invention, a diameter of the opening of the near-field probe 44 is minimized, and a light transmission (throughput) rate is increased, so that a larger mount of information (data) is stored on the optical disc 42.

A process of reading the information, which is stored on the optical disc 42 through the above writing process, from the optical disc 42 will be explained hereinafter.

When the laser beam (light) is scanned on the optical disc 42 storing the information through the above writing process, the light incident on the optical disc 42 is reflected from the optical disc 42 to the near-field probe 44, and the reflected light is transmitted to the lens through the optical fiber 43 and the near-field probe 44. The light wave-guided through the optical fiber 43 is condensed on the beam splitter 46 by the lens 45.

The beam splitter 46 splits the light received from the lens 45 to transmit the received light to the photo detector 47, and the photo detector 47 detects the optical signal separated from the beam splitter 46 and converts the detected optical signal into the current signal to be outputted to the signal reproducing unit 48.

The signal reproducing unit reproduces the information (data) stored on the optical disc according to the current signal converted by the photo detector 47.

The optical disc 42 includes a non-deformed portion and a deformed portion corresponding to the stored data. The intensities of the light reflected from corresponding ones of the non-deformed portion and the deformed portion are different from each other. Accordingly, the intensities of the current signals detected by the photo detector 47 are determined in proportion to the intensities of the light reflected from the optical disc 42.

Since the intensities of the current signals vary according to the intensities of the light, the signal reproducing unit 48 reproduces the data from the optical disc 42 by comparing the current signal with a reference signal.

For example, When the current signal is greater than the reference signal, the signal reproducing unit 48 outputs "1" as the current signal, and the current signal is less than the reference signal, the signal reproducing unit 48 outputs "0" as the current signal, thereby reproducing the data stored on the optical disc 42 as a digital signal.

Since the data is reproduced by reflecting the incident light reflected from the optical disc 42 and receiving the reflected light through the near-field probe 44, it becomes easy to reproduce the data stored on the optical disc 42 according to the intensity of the light reflected from the optical disc 42. Here, the intensity of the light reflected from the optical disc 42 is proportional to the intensity of the light transmitted through the near-field probe 44.

According to another aspect of the present invention, the optical information recording and/or reproducing apparatus 40 can rapidly and accurately reproduces the data by increasing the light transmission rate of the near-field probe 44.

Figure 5:
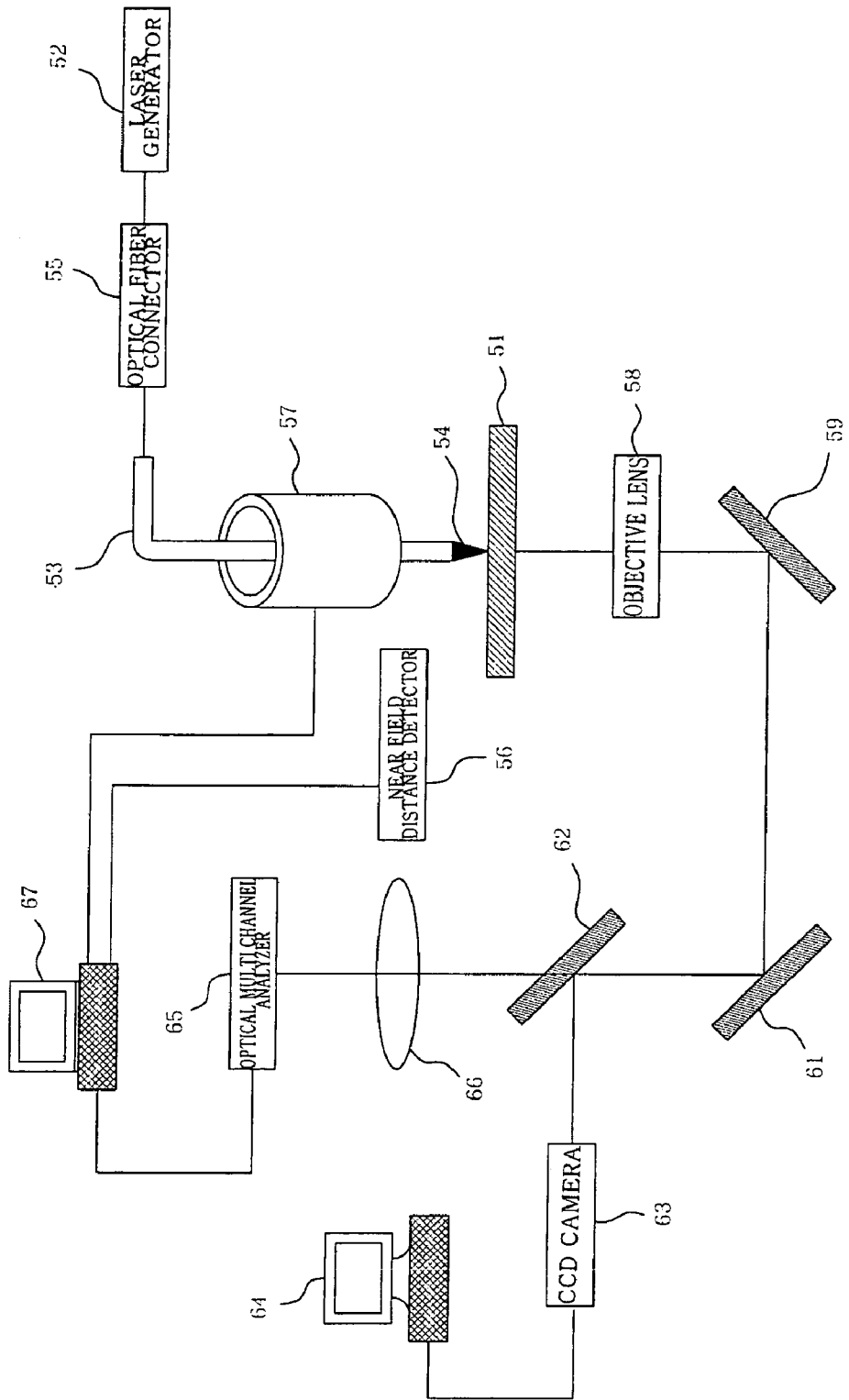
FIG. 5 is a view showing a near-field scanning optical microscope apparatus according to another embodiment of the present invention.

FIG. 5 is a view showing a near-field scanning optical microscope apparatus 50 according to another embodiment of the present invention.

Referring to FIG. 5, the near-field scanning optical microscope apparatus 50 includes a laser beam (light) generator 52 generating a laser beam (light) generator 52 to search for a characteristic of a sample material 51, an optical fiber 53 wave-guiding the laser beam emitted from the laser beam generator 52 and condensing the laser beam to a near-field probe 54, an optical fiber connector 55 condensing the laser beam emitted from the laser beam generator 52 to the optical fiber 53, a near-field distance detector 56 detecting a distance between the test material 51 and the near-field probe 54, and a minute (fine) displacement controller 57 controlling the distance between the test material 51 and the near-field probe 54 to be maintained constant.

The near-field scanning optical microscope apparatus 50 further includes an objective lens focusing the light transmitted through the test material 51, a first mirror 59 reflecting the focused light, a second mirror 61 reflecting the light reflected from the first mirror 59, a beam splitter 62 transmitting a first portion of the light reflected from the second mirror 61 and reflecting a second portion of the light reflected from the second mirror 61, a CCD (charged coupled device) camera 63 generating an image corresponding to the characteristic of the test material 51 according to the light reflected from the beam splitter 62, and a monitor 64 displaying the image generated from the CCD camera 63.

The near-field scanning optical microscope apparatus 50 further includes an OMA (optical multi-channel analyzer) 65 detecting the intensity of the light transmitted through the beam splitter 62 according to each wavelength of the light, a lens 66 condensing the light transmitted through the beam splitter 62 on the OMA 65, and a main controller 67 controlling the minute displacement controller 57 according to a distance detected by the near-field distance detector 56.

The laser beam generator 52 generates the laser beam (light) using a solid material or a gas material. The near-field distance detector 56 is disposed adjacent to the near-field probe 54 or disposed to contact a side wall of the near-field probe 54 so that the distance between the near-field probe 54 and the test material 51.

The first mirror 59 reflects the light focused by the objective lens 58, and the second mirror 61 reflects the light so that the incident light is perpendicular to the reflected beam. The second mirror 61 reflects the light to the beam splitter 62 so that the reflected light to the beam splitter 62 is perpendicular to the received light from the first mirror 59.

The monitor 64 is a display apparatus using a computer monitor, such as an LCD monitor.

The lens 66 is a convex lens to condense the light transmitted through the beam splitter to the OMA 65. The main controller 67 is realized by a computer which includes a program analyzing the characteristic of the test material 51 using the intensity of the light detected by the OMA 65 and also includes another program controlling the minute displacement controller 57 according to the distance detected by the near-field distance detector 56.

A process of detecting the characteristic of the test material 51 by irradiating the laser beam on the test material 51 in the near-field scanning optical microscope apparatus 50 will be explained in more detail.

Before the laser beam is irradiated on the test material 51, the near-field probe 54 should be disposed to be spaced-apart from the test material 51 by a distance. The distance between the test material 51 and the near-field probe 54 is controlled by the minute displacement controller 57.

In a process of controlling the distance of the near-field probe 54, a detected value corresponding to the distance by detecting the distance between the test material 51 and the near-field probe 54 is outputted to the main controller 67 by the near-field distance detector 56, and then the main controller 67 determines whether the detected value (detected distance) is equal to a reference distance. Upon determining that the detected distance is equal to the reference distance, the main controller 67 controls the near-field probe 54 to be disposed at a current position.

Upon determining that the detected distance is not equal to the reference distance, the main controller 67 controls the minute displacement controller 57 so that the near-field probe 54 is maintained predetermined position and distance with respect to the test material 51, and then the minute displacement controller 57 controls the near-field probe 54 to be fixedly disposed at the predetermined position and distance indicated by the main controller 67.

In a state that the near-field probe 54 is fixed over the test material 51 through this process, the laser beam generator 52 generates the light (laser beam) to be used to analyze the characteristic of the test material 51, and the optical fiber connector 55 condenses the laser beam on the optical fiber 53.

The laser beam condensed by the optical fiber connector 55 is wave-guided to the near-field probe 554 through the optical fiber 53. The laser beam wave-guided by the optical fiber 53 is condensed into a predetermined size, which is smaller than a refraction limitation, by the near-field probe 54.

The laser beam forming the near-field adjacent to the opening of the near-field probe 54 is irradiated to the test material 51 to be transmitted to the objective lends 58 through the test material 51. A difference between intensities of the light incident to the test material 51 and transmitted through the test material occurs according to the characteristic of the test material 51.

The transmitted laser beam through the test material 51 is focused on the first mirror 59 by the objective lens 58, and then the laser beam is reflected to the second mirror 61 by the first mirror 59. The laser beam reflected by the second mirror 61 is transmitted to the beam splitter 62.

The beam splitter 62 transmits the first portion of the laser beam reflected by the second mirror 62 to the lens 66 and reflects the second portion of the laser beam to the CCD camera 63.

The CCD camera 63 generates the image representing the characteristic of the test material 51 using the laser beam reflected by the beam splitter 62 so that the image is displayed on the monitor 64.

When the laser beam transmitted through the beam splitter 62 is focused to the OMA 65 by the lens 66, the OMA 65 detects the intensity of the laser beam focused by the lens according to the wavelength of the laser beam to output the intensity of the laser beam to the main controller 67.

The main controller 67 analyzes the characteristic of the test material 51 using the program and the intensity of the laser beam detected by the OMA 65 and stores data representing the characteristic of the test material 51. The data stored in a memory by the main controller 67 is displayed on a screen of a monitor or transmitted to an external device.

As described above, since the near-field scanning optical microscope apparatus 50 analyzes the characteristic of the test material 51 using the laser beam forming the near field, the characteristic of the test material 51 can be accurately analyzed according to the strength of the intensity of the laser beam.

According to another aspect of the present invention, the analyzing of the characteristic of the test material 51 can be effectively performed using the intensity of the laser beam when the light transmission rate of the near-field probe 54 is increased.

The refraction limitation of the light can be overcome using the near-field scanning optical microscope apparatus 50 which can perform a spatially analysis below a wavelength of a frequency. The near-field scanning optical microscope apparatus 50 can be used as a next generation optical information storing apparatus to detect an optical characteristic occurring in a very minute area of a test material or a test device to closely examine the characteristic of an ultra minute structure and to control the light transmission rate of a limited section of the test material or the test device. Moreover, scanning probe recording technologies adapted for use in the near-field scanning optical telescope apparatus and an atomic telescope can be improved using a probe used in the near field to overcome a minimum size of a focal point with which the laser beam can be focused.

However, since the probe having a very low light transmission rate has a limitation on a signal to noise (SN) ratio and a recording and reproducing speed, various problems occur when the probe is used for a high density optical recording apparatus.

In order to overcome the above and/or other problems, the light transmission rate of the near-field probe may be improved according to present invention. In the optical fiber probe, the light transmission rate can be improved by changing a structure of a distal end of the probe and adding a minute metal particle to the probe. The light transmission rate may also be improved by inserting a non-linear material into an inside of the probe using a silicon minute manufacturing process. However, an amplification of a disperse wave is a major issue on the probe manufactured by the above-described process. Therefore, the probe is limited in improving the light transmission rate.

Accordingly, in the optical fiber probe of the present invention, the wave-guided light can be generated from the probe having a size smaller than a wavelength of the light compared to a conventional probe structure in which the light transmission rate is lowered when the wave-guided light is converted into the dispersed light sue to the probe size.

Figure 6A:
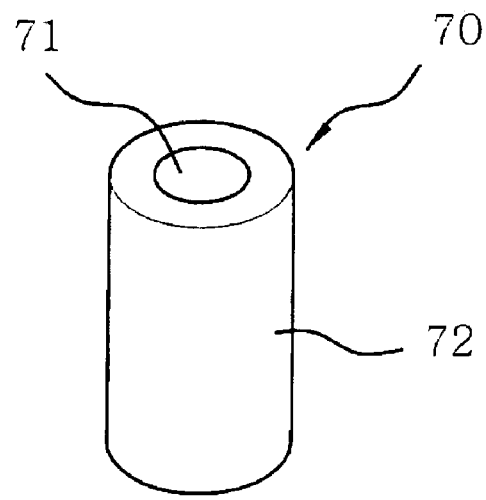
FIG. 6A is a perspective view of an optical fiber used with the optical information recording and/or reproducing apparatus and/or the near-field scanning optical microscope apparatus shown in FIGS. 4 and 5, respectively.
Figure 6B:
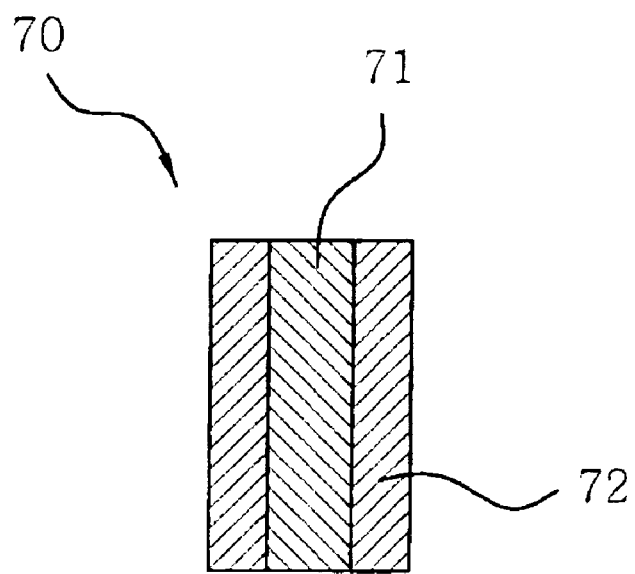
FIG. 6B is a cross-sectional view of the optical fiber shown in FIG. 6A.
Figure 7:
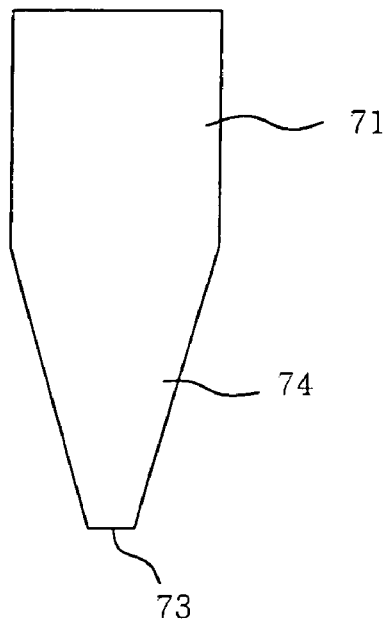
FIG. 7 is an optical fiber probe formed by a pulling process and used with the optical information recording and/or reproducing apparatus and/or the near-field scanning optical microscope apparatus shown in FIGS. 4 and 5, respectively.

A structure of the optical fiber probe and a manufacturing method of manufacturing the same will be explained hereinafter. FIG. 6A is a perspective view of an optical fiber 70 used with the optical information recording and/or reproducing apparatus 40 and/or the near-field scanning optical microscope apparatus 50 shown in FIGS. 4 and 5, respectively. FIG. 6B is a cross-sectional view of the optical fiber 70 shown in FIG. 6A. FIG. 7 shows an optical fiber probe formed by a pulling process and used with the optical information recording and/or reproducing apparatus and/or the near-field scanning optical microscope apparatus shown in FIGS. 4 and 5, respectively.

Referring to FIGS. 6A, 6B, and 7, the optical fiber 70 includes a core 71 wave-guiding a laser beam (light) incident from an external laser beam (light) source, and a cladding 72 coated on a surface of the core 71 to protect the core 71.

The core 71 is made of plastic or quartz (silica) glass and has a diameter of 10 µm. The cladding 72 is made of a glass material having a refraction ratio different from that of the core 71.

A method of forming the optical fiber 70 having the above structure is explained with reference to FIGS. 6A and 6B. In a state that an end of the core 71 is heated with heat higher than a predetermined temperature. While the other end of the core 71 is fixed on a device, the heated one end of the core 71 is formed with a probe 74 having an opening 73 of a circular cone shape by the pulling process using the device.

According to another aspect of the present invention, a diameter of the opening 73 is 0.05 µm through 0.3 µm. A size of the near field formed on the opening 73 by the light transmitted through the probe 74 is smaller than 100 µm.

Figure 8:
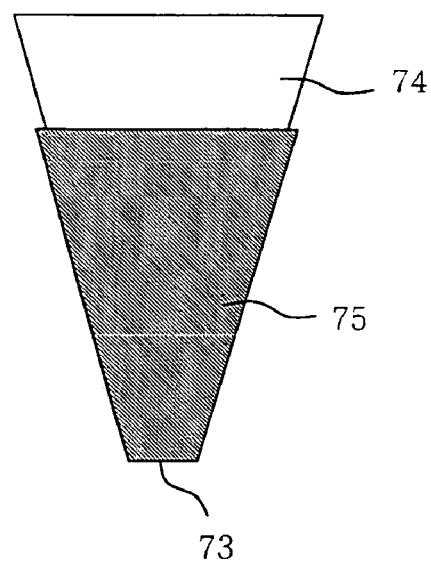
FIG. 8 is a side view of a near-field probe of the optical fiber probe of FIG. 7 having a thin metal layer coated thereon.

FIG. 8 is a side view of a near-field probe 74 of FIG. 7 having a thin metal layer 75 coated thereon. After the near-field probe 74 is formed through the pulling process, a metal material made of aluminum is coated to form the thin metal layer 75 on an external circumference of the near-field probe 74.

At least one portion of the thin metal layer 75 is removed by irradiating a focused ion beam on the coated near-field probe 74. When the at least one portion of the thin metal layer 75 is removed, the optical fiber probe is formed in a shape as shown in FIGS. 9A and 9B.

Figure 9A:
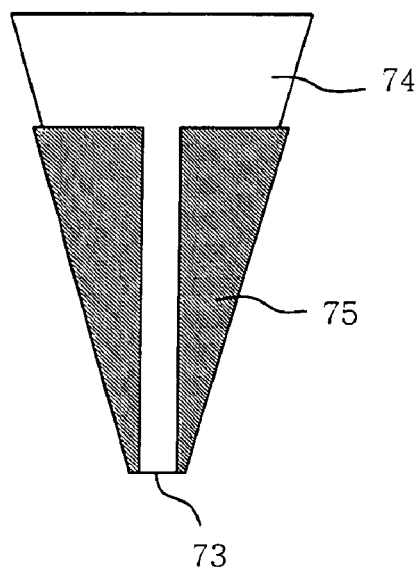
FIG. 9A is a side view of the optical fiber probe of FIG. 7 using an electrical potential difference.

FIG. 9A is a side view of the optical fiber probe of FIG. 7. An electrical potential difference is used in the optical fiber probe, and FIG. 9B is a perspective view of the optical fiber probe of FIG. 7 using the electrical potential difference.

Figure 9B:
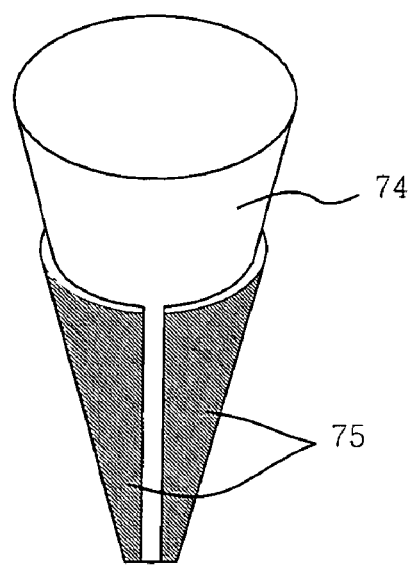
FIG. 9B is a perspective view of the optical fiber probe of FIG. 7 using the electrical potential difference.

Referring to FIGS. 9A and 9B, a plurality of metal layers 75 is coated on the surface of the near-field probe 74 to be spaced-apart from each other by a distance. The distance between the metal layers 75 varies according to the intensity of the laser beam wave-guided by the optical fiber 70. The distance between the metal layers 75 may also vary according to a wavelength of the laser beam and a material of the metal layers 75. When the number of the metal layers 75 is two, the metal layers 75 are referred to first and second metal layers 75. However, the number of the metal layers 75 is not limited thereto. The number of the metal layers 75 may be greater than two.

For example, when the wavelength of the laser beam is 400 nm, and the material of the metal layers is aluminum, at least one of the first and second metal layers 75 is coated on the near-field probe to have an angle $\theta_\theta \phi_0$ of 60° formed by both sides of the at least one of the first and second metal layers 75 with respect to a center of the near-field probe 74.

If the wavelength of the laser beam is 650 nm, and the material of the metal layers is silver, the at least one of the first and second metal layers 75 is coated on the near-field probe 74 to have the angle $\theta_\theta \phi_0$ of 90° formed by the both sides of the at least one of the first and second metal layers 75 with respect to the center of the near-field probe 74.

Figure 10A:
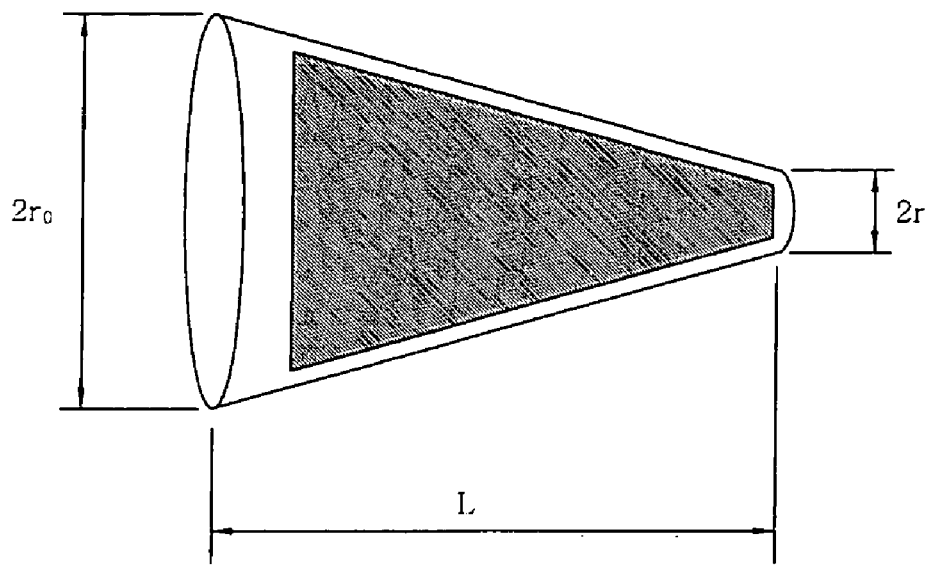
FIGS. 10A and 10B are views explaining characteristics of the optical fiber probe shown in FIG. 7.
Figure 10B:
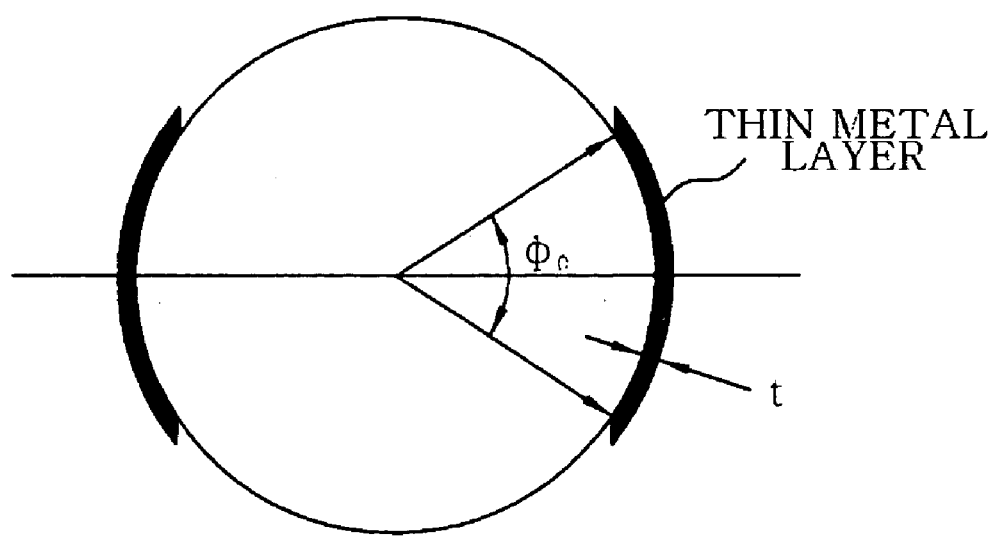

The characteristics of the optical fiber probe having the above structure according to another aspect of the present invention will be explained hereinbelow with reference to FIGS. 10A and 10B. FIGS. 10A and 10B are views explaining the characteristics of the optical fiber probe shown in FIG. 7.

Examples of a quantitative structure of the optical fiber probe are shown in the following table.

| Material | Wavelength | $r_0$ | r | t | Φ | L |
|---|---|---|---|---|---|---|
| Aluminum | 400 nm | 200 nm | 15 nm | 8 nm | 60° | 2000 nm |
| Silver | 650 nm | 250 nm | 5 nm | 4 nm | 90° | 4000 nm |

Here, r is a radius of the opening, $r_0$ is a radius of the optical fiber probe to which the wave-guided laser beam is inputted, t is a thickness of the metal layers 75, $\Phi_0$ is an angle formed by both sides of the metal layer 75 with respect to a center of the near-field probe 74, and L is a length of the near-field probe 74.

An efficiency of the light transmission rate of the optical fiber probe having the above quantitative structure as shown in the above table will be explained with reference to the following formulas 1 and 2.

$$K_L = P_a/P_i \qquad \text{Formula 1}$$

The above formula 1 shows a light loss ratio $K_L$ of the near-field probe 74. The light loss ratio $K_L$ represents the amount of the light lost when the light incident to the near-field probe 74 passes through the opening, and calculated from a first amount $P_i$ of the light incident to the near-field probe 74 and a second amount $P_a$ of the light transmitted through the opening among the light incident to the near-field probe 74.

When the material of the metal layer 75 is made of aluminum, the light loss ratio $K_L$ may be 0.5. However, when the material of the metal layer 75 is made of silver, the light loss ratio $K_L$ may be is 0.448.

$$Kef \approx 0.4 * \rho_0/\sqrt{\epsilon}[2r_0/3\lambda]^2/K_L \qquad \text{Formula 2}$$

The above formula 2 shows a light transmission ratio Kef of the near-field probe 74. The light transmission ratio Kef is defined by a ratio of an energy amount of energy of the light emitted from the opening with an energy amount of the light incident to the near-field probe 74.

In the formula 2, $\rho_0$ is an impedance (377 Ω) of a free space, $\epsilon$ is a dielectric ratio, and λ is a wavelength of the light.

Here, when the material of the metal layer 75 is made of aluminum, the light transmission ratio Kef may be 0.03. However, when the material of the metal layer 75 is made of silver, the light transmission ratio Kef may be is 0.0001.

$$K_e = |E_a|^2/|E_i|^2 \approx [r_0/r]^2 * 4/k_L \qquad \text{Formula 3}$$

The above formula 3 shows an increment Ke of the light intensity (light strength) at the near-field probe 74. When the energy per a unit area inputted into the near-field probe 74 is defined as the light intensity, the light intensities at a near field area and the input area of the near-field probe 74 can be calculated. It is possible to obtain a large ratio of the light intensity of the near field area and the light intensity of the input area of the near-field probe 74 since a spot size of the near field area, through which the light is emitted, is small. The ratio is called the increment of the light intensity.

The increment Ke of the light intensity is calculated using a first electrical amplitude Ei at the input area of the near-filed probe 74 and a second electrical amplitude Ea at the near field area of the opening of the near-field probe 74. That is, the increment Ke of the light intensity is defined by a ration of a square value of an absolute value of the first electrical amplitude Ei of the input area and a square of an absolute value of the second electrical amplitude Ea of the near field area of the opening.

Here, when the material of the metal layer 75 is made of aluminum, the increment Ke of the light intensity may be 355. However, when the material of the metal layer 75 is made of silver, the increment of the light intensity Ke may be 7530.

As described above, the first and second metal layers 75 coated on the near-field probe of the optical fiber probe are spaced-apart from each other by the distance, and an electrical potential difference occurs between the first and second metal layers 75. Since electric-magnetic waves passing through the near-field probe 74 includes an electrical field component vibrating in temporal and spatial areas, an electrical field difference is induced between the first and second metal layers 75 so that the electrical potential difference is generated.

The optical fiber probe includes a minute probe tip and the first and second metal layers 75. The minute probe tip is limited to a size smaller than the wavelength of the light to increase a higher spatial resolution, and the spaced-apart and coated first and second metal layers 75 have different electrical potentials to form a wave mode. The above structure of the first and second metal layers 75 enables the wave-guided light to propagate even in an area smaller than the wavelength of the light.

Accordingly, since a basic wave light is enabled to be transmitted through the optical fiber probe, the light transmission rate is increased. By increasing the amount of the transmitted light, a signal to noise ration of the optical fiber probe is improved, and a period of time taken to record and/or reproduce the optical information is shortened. In addition, since the intensity of the light used in recording and/or reproducing the optical information in the optical information recording and/or reproducing apparatus is lowered, the optical fiber probe according to the embodiment of the present invention can be effectively used as a near-field recording probe.

As described above, the present invention provides the optical fiber probe having conductive materials coated thereon. The electrical potential difference is generated between the conductive materials, thereby increasing the light transmission rate, improving the signal to noise ratio, and shortening the time taken to record and/or reproduce the optical information.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. An optical fiber probe comprising:
   a near-field probe having a core transmitting light incident from an external light source and having a circular cone structure formed on an end of the core, and a cladding coated on a surface of the circular cone structure core to protect the core; and
   a plurality of thin metal layers coated on the near-field probe, symmetrically disposed on opposite sides of the near-field probe, and spaced-apart from each other to generate an electrical potential difference;

wherein the thin metal layers are spaced-apart from each other by a distance according to at least one of a wavelength of light incident to the near-field probe and a characteristic of a material forming the thin metal layers; and wherein at least one of the thin metal layers comprises sides forming an angle of 60° with respect to a center of the near-field probe when the wavelength of the light is 400 nm.

2. The optical fiber probe of claim 1, wherein the thin metal layers is made of aluminum.

3. The optical fiber probe of claim 1, wherein the near-field probe is formed with a conductive layer coated thereon, and at least two portions of the conductive layer are removed to form the thin metal layers.

4. The optical fiber probe of claim 1, wherein the electrical potential difference is generated between the thin metal layers to allow light to pass through the near-field probe.

5. An optical fiber probe comprising:

a near-field probe having a core transmitting light incident from an external light source and having a circular cone structure formed on an end of the core, and a cladding coated on a surface of the circular cone structure core to protect the core; and a plurality of thin metal layers coated on the near-field probe, symmetrically disposed on opposite sides of the near-field probe, and spaced-apart from each other to generate an electrical potential difference;

wherein the thin metal layers are spaced-apart from each other by a distance according to at least one of a wavelength of light incident to the near-field probe and a characteristic of a material forming the thin metal layers; and wherein at least one of the thin metal layers comprises sides forming an angle of 90° with respect to a c/enter of the near-field probe when the wavelength of the light is 650 nm.

6. The optical fiber probe of claim 5 wherein said thin metal layers are made of silver.

7. The optical fiber probe of claim 5, wherein the near-field probe is formed with a conductive layer coated thereon, and at least two portions of the conductive layer are removed to form the thin metal layers.

8. The optical fiber probe of claim 5, wherein the electrical potential difference is generated between the thin metal layers to allow light to pass through the near-field probe.

* * * * *